Feb. 14, 1956  K. W. GRAYBILL  2,734,974
SWITCH WIPER
Filed Feb. 13, 1953  2 Sheets-Sheet 1

INVENTOR.
KENNETH W. GRAYBILL
BY *Wm Walter Owen*
ATTY.

United States Patent Office 2,734,974
Patented Feb. 14, 1956

2,734,974

SWITCH WIPER

Kenneth W. Graybill, Elmhurst, Ill., assignor to Automatic Electric Laboratories, Inc., Chicago, Ill., a corporation of Delaware Application February 13, 1953, Serial No. 336,732

12 Claims. (Cl. 200—166)

My invention pertains to switching mechanism contacts generally, and the preferred embodiment of my invention relates to improvements in the wipers of the well known Strowger switch in which a set of movable wipers are adapted to successively engage a set of fixed, spaced, and coplanar bank contacts in succession. While the wipers disclosed are designed for use with a Strowger switch, it will be apparent that they could be adapted for use in any type of switching device.

The principal object of my invention is to provide such a wiper with a contacting surface having novel, independently acting, twin contacts.

Another object of my invention is to provide a switch wiper or contactor with a revoluble contact that preferably makes point contact during switching operation—this results in long wear of the wiper as well as the contacts over which it moves.

A further object of my invention is to provide a lubricant storage and automatic applicator means on the twin contacts of the switch wiper contactor so that a lubricant contained therein can be applied to the surfaces of the stationary contacts of the switch.

A still further object of my invention is to provide a rider insulator on the wiper adjacent to the wiping contact so that as the wiping contact passes off of one of the stationary coplanar contacts the rider insulator passes onto the same to prevent the wiping contact from dropping appreciably below the plane of the top surface of the succeeding stationary contact.

Yet another object of my invention is to improve the electrical characteristics of the contact between the wiper contacts and the stationary contacts.

My novel, twin contact, Strowger switch wiper comprises a wiping type contact disposed on the end of the wiper main spring and a plated spherical contact disposed partially through an aperture in the wiping contact and constrained there by the action of a stressed, auxiliary spring having its free end in continuous abutment with the spherical contact. The rider insulator is also secured to the end of the main spring, adjacent the wiping contact.

My invention will appear more clearly, and further objects and advantages will become apparent from the following detailed description when taken in conjunction with the accompanying drawings, which show by way of example the preferred embodiment of the inventive idea.

In the drawings:

Figure 1 is a plan view of a Strowger switch wiper assembly which consists of a set of similar and opposed wiper springs which incorporate my novel contacting features.

Figure 2 is an elevation view of the wiper assembly.

Figure 3 is a view of the end of the wiper assembly taken from the left of Figure 1; this view shows only the construction details of the contacting portions of the wipers in order to more clearly illustrate the novel features thereof.

Figure 4:
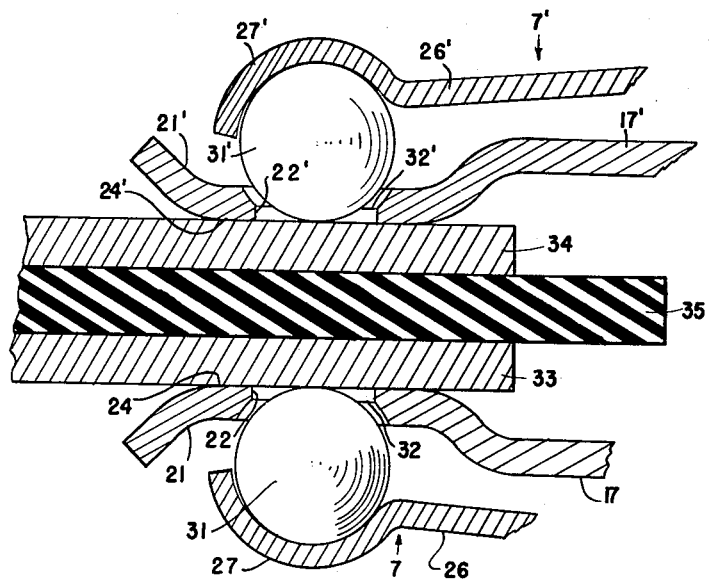
Figure 4 is an enlarged sectional view of the contacting portions of the wipers taken in the direction of the arrows on the line 4—4 of Figure 1; this view additionally shows a pair of the bank contacts engaged by the wipers.

Referring now to the drawings, particularly to Figures 1 and 2, it will be seen that the wiper assembly comprises a hub 1 having a tubular extension 2; an aperture 3 extends through hub 1 and extension 2, and a set screw 4 is threaded into hub 1 for securing the hub onto a shaft (not shown) of the Strowger switch. The remaining components of the wiper assembly are supported by the hub 1. These include a washer 6 of insulating material, a lower spring assembly, generally indicated 7, an insulator 8, an upper spring assembly, generally indicated 7', a cord guide 11 having an eyelet 12 therein, and a washer 13. After proper alignment of the components, the end of extension 2 is peened or rolled over, as at 15, to permanently clamp these components together.

(It is to be noted that the primed reference characters in the description immediately following refer to the structure of the upper spring assembly 7'.)

The lower and upper spring assemblies 7 and 7' are similar; lower spring assembly 7 comprises a main spring 14 having an electrical terminal 16 extending therefrom, and upper spring assembly 7' comprises a main spring 14' having an electrical terminal 16' extending therefrom. A pair of substantially I-shaped main spring extensions 17, 17' are secured to the shanks of springs 14, 14' by means of rivets such as 18' (Figure 1) and tabs such as 19, 19' and 20'. A pair of cup shaped, wiping type, contacting portions 21, 21' having apertures 22, 22' therein are formed on the ends of spring extensions 17, 17'. Rider insulators 23, 23' are secured on the contacting portions 21, 21', adjacent apertures 22, 22'. A pair of annular wiping contact portions 24, 24' circumscribe apertures 22, 22'. A pair of bifurcated cantilever type, auxiliary springs 26, 26', having sockets 27, 27' at their ends, are secured to the spring extensions 17, 17' by means of rivets such as 28, 28' and 29'.

The similar and opposing auxiliary springs 26, 26' are stressed in assembly to constrain spherical contacts, or balls, 31, 31' between the related annular edges 32, 32' around openings 22 and 22' and the sockets 27, 27'.

Figure 4 illustrates my novel twin contact feature. In the figure, wiping contacts 24, 24' and ball contacts 31, 31' are shown in engagement with a pair of fixed bank contacts 33 and 34, said ball contacts being out of engagement with edges 32 and 32'. Said fixed bank contacts are separated by a strip of insulation 35. It is to be understood that Figure 4 illustrates two sets of twin contacts, one for each spring assembly, one set comprising the wiping contact 24 and ball contact 31 and the other set comprising wiping contact 24' and ball contact 31'. It is also to be understood that the fixed contacts 33 and 34 are only one pair of a series of such contacts extending in rows along the upper and lower surfaces of strip 35. Such bank contacts are well known in the art.

To further improve contacting performance, each of the small cup shaped portions 21, 21' may be filled with a small amount of viscous lubricant which can be automatically deposited on the surfaces of bank contacts 33, 34 as the wiper contacts move across the bank contacts.

The design of the extremity of each of the similar main spring extensions 17, 17' is such that as each of the opposing wiping contacts 24, 24' and the ball contacts 31, 31' pass off of a pair of bank contacts the rider insulators 23, 23' (Fig. 3) pass onto the same. This feature prevents the wiping contacts from dropping appreciably below the planes of the conducting surfaces of the succeeding bank contacts when in transit from one set of contacts to the next to improve the wearing of the wiping contacts and the bank contacts; the wearing of the contacts is improved because the wiping contacts engage the bank contacts nearer the latter's top edge and consequently move a smaller vertical distance during each encounter.

While the features of this invention have been disclosed with reference to a specific embodiment only, it is, of course, understood that various modifications may be made in the details of construction without departing from the scope of this invention.

What is claimed is:

1. A wiper for use in a switch having fixed contacts, comprising a conducting main spring having a terminal, a member having a wiping type contact thereon and an aperture therethrough and being connected to said main spring, a spherical contact having a larger diameter than said aperture and being seated against an edge of said aperture, and a stressed cantilever type spring having its fixed end operatively connected to said main spring and having its free end operatively engaged with said spherical contact, tending to constrain the same in said aperture and against said edge when the wiper is out of engagement with said fixed contact, both said wiping type contact and said spherical contact being engaged with one of said fixed contacts when the wiper is in contact therewith.

2. In a wiper for use in a switch having a fixed contact; a conducting and movable main spring having a terminal, a main spring extension connected to said main spring, said extension having an aperture therethrough that is circumscribed by an annular wiping contact, a spherical contact having a larger diameter than said aperture and being seatable against an edge of said aperture, and a stressed cantilever type spring having its fixed end operatively connected to said main spring and having its free end operatively engaged with said spherical contact, tending to constrain the spherical contact in said aperture and against said edge, said spherical contact being partially disposed through, and protruding from, said aperture and seated against said edge when the wiper is out of engagement with said fixed contact, and both said spherical contact and said annular contact being in engagement with said fixed contact when the wiper is in contact therewith.

3. In a wiper for use in a switch mechanism having a set of fixed, spaced, and substantially coplanar contacts in abutment with a plane insulator; a movable conducting resilient member having a terminal and an end portion, a wiping type contact on said end portion, an aperture in said wiping contact, a revoluble contact, and means for operatively engaging said revoluble contact with said end portion and causing it to partially protrude through the aperture in said wiping contact, said revoluble contact and said wiping type contact both engaging said fixed contact when said wiper is in contact therewith.

4. In a wiper according to claim 3, a rider insulator secured to said end portion and being aligned with said wiping contact and cooperating therewith by engaging said fixed contacts during movement of said member to thereby prevent said wiping contact from engaging said plane insulator.

5. In a switch wiper, a conducting main spring member having an aperture therethrough and a terminal, a conducting cantilever type spring member having its fixed end operatively connected to said main spring and having its free end disposed near said aperture, and a spherical contact having a larger diameter than said aperture and partially disposed in said aperture and protruding therefrom and in abutment with the free end of said cantilever spring, said cantilever spring acting to constrain said spherical contact against and partially through said aperture when the wiper is out of engagement with the fixed bank contact, both said spherical contact and said wiping contact engaging said fixed bank contact when the wiper is engaged therewith.

6. In a wiper for use in a switch having a fixed contact; a movable conducting spring having a terminal, a wiping type contact on the end of said spring, a revoluble contact, and means, including spring means, for connecting said revoluble contact to said movable spring, said wiping contact and said revoluble contact engaging said fixed contact making a twin contact therewith.

7. A wiper of the character described for use with a switch having fixed contacts comprising a movable, conducting, resilient member having a terminal and a resilient tip portion, a wiping type contact on said tip portion, a revoluble contact, and means for operatively connecting said revoluble contact to said tip portion, both said revoluble contact and said wiping type contact engaging the fixed contacts when said wiper is in contact therewith.

8. In a wiper according to claim 7, a rider insulator secured to said tip portion and being aligned with said wiping contact to engage said fixed contact when the wiping type contact disengages said fixed contact.

9. In a switch wiper according to claim 7; a lubricant storage means on said member, and means, including said revoluble contact, for permitting said revoluble contact to additionally act as a lubricant applicator.

10. For use in a rotary switch having a bank of fixed contacts mounted in a row with a strip of insulation between the fixed contacts, a wiper for movement over said fixed contacts, said wiper including a main spring with a wiping type contact at the end thereof in alignment with the fixed contacts and having an opening therein, a revoluble contact mounted on said wiping type contact and protruding through said opening in engagement with said fixed contacts as the wiper is moved thereover, an auxiliary spring exerting pressure against said revoluble contact to maintain the same in its opening and against the fixed contacts, a trailing edge on the end of said main spring, a bushing on said edge adjacent the wiping type contact, said bushing preventing said revoluble contact and wiping type contact from engaging the strip of insulation as the wiper moves from one fixed contact to another.

11. In a wiper according to claim 10, in which the end of the said main spring is cup shaped to hold a lubricant, said revoluble contact being so disposed in said opening as to disperse said lubricant over the fixed contacts when the wiper passes thereover.

12. In a wiper for use in a switch having fixed contacts; a conducting main member, a tip portion on said main member having an aperture therein, a spherical contact mounted in said aperture, a cantilever spring having its fixed end operatively connected to said main member and its free end having a socket thereon adjacent to said aperture and surrounding said spherical contact, said spherical contact rotatable in said socket and moved away from said aperture when engaging with said fixed contacts as the wiper is moved thereover, said contact constrained by said cantilever spring against and partially through said aperture when said spherical contact is out of engagement with a fixed contact.

References Cited in the file of this patent

UNITED STATES PATENTS

| | | |
|---|---|---|
| 1,062,185 | Pierce | May 20, 1913 |
| 1,694,928 | Rider | Dec. 11, 1928 |
| 1,892,008 | Ross | Dec. 27, 1932 |
| 2,034,683 | Olandt | Mar. 17, 1936 |
| 2,453,106 | Yardeny et al. | Nov. 2, 1948 |
| 2,507,429 | Woodland | May 9, 1950 |